(12) United States Patent
Mingers et al.

(10) Patent No.: US 9,406,983 B2
(45) Date of Patent: Aug. 2, 2016

(54) BATTERY MODULE

(71) Applicant: Dr. Ing. h.c. F. Porsche Aktiengesellschaft, Stuttgart (DE)

(72) Inventors: Thierry Mingers, Sospel (FR); Tim Schmidt, Ludwigsburg (DE); Dominik Grass, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/699,065

(22) Filed: Apr. 29, 2015

(65) Prior Publication Data

US 2015/0333382 A1    Nov. 19, 2015

(30) Foreign Application Priority Data

May 15, 2014    (DE) .......................... 10 2014 106 852

(51) Int. Cl.
| | |
|---|---|
| *H01M 10/65* | (2014.01) |
| *H01M 2/10* | (2006.01) |
| *H01M 10/613* | (2014.01) |
| *H01M 10/625* | (2014.01) |
| *H01M 2/20* | (2006.01) |

(52) U.S. Cl.
CPC ............ *H01M 10/65* (2015.04); *H01M 2/1072* (2013.01); *H01M 2/1094* (2013.01); *H01M 2/206* (2013.01); *H01M 10/613* (2015.04); *H01M 10/625* (2015.04); *H01M 2/105* (2013.01); *H01M 2/1016* (2013.01); *H01M 2/1077* (2013.01); *H01M 2/1083* (2013.01); *H01M 2220/20* (2013.01)

(58) Field of Classification Search
CPC . H01M 2/105; H01M 2/1016; H01M 2/1077; H01M 2/1083
See application file for complete search history.

(56) References Cited

U.S. PATENT DOCUMENTS

| | | | |
|---|---|---|---|
| 2010/0285346 | A1 | 11/2010 | Graban et al. |
| 2012/0288745 | A1 | 11/2012 | Payne |

FOREIGN PATENT DOCUMENTS

| | | |
|---|---|---|
| DE | 10 2007 063 187 | 4/2009 |
| DE | 10 2007 063 174 | 6/2009 |
| DE | 10 2008 034 870 | 1/2010 |
| DE | 10 2008 059 960 | 6/2010 |
| DE | 10 2012 218 102 | 6/2013 |

OTHER PUBLICATIONS

German Search Report of Nov. 28, 2014.

*Primary Examiner* — Jane Rhee
(74) *Attorney, Agent, or Firm* — Gerald E. Hespos; Michael J. Porco; Matthew T. Hespos

(57) ABSTRACT

A battery module (10) for the purely electric driving of a motor vehicle has a trough-shaped battery box (12) that runs around a circumferential direction, an inlet for feeding a coolant into a cooling space (30) partially bounded by the battery box (12), an outlet for conducting the coolant away from the cooling space (30), battery cells (14) in the battery box (12) and arranged in the cooling space (30), and an insulating layer (16) for fluid-tight sealing of the cooling space (30). At least one electrical pole (18) of the battery cell (14) projects out of the cooling space (30) through the insulating layer (16). The insulating layer (16) is formed from a previously liquid cured sealing compound. The insulating layer (16) can simultaneously make available a high sealing effect and a statically stabilizing effect for the battery box (12) together with a low intrinsic weight.

16 Claims, 3 Drawing Sheets

BATTERY MODULE

CROSS REFERENCE TO RELATED APPLICATION

This application claims priority under 35 USC 119 to German Patent Appl. No. 10 2014 106 852.1 filed on May 15, 2014, the entire disclosure of which is incorporated herein by reference.

BACKGROUND

1. Field of the Invention

The invention relates to a battery module for the purely electric driving of a motor vehicle, by means of which sufficient electrical energy can be stored to be able to drive a motor vehicle.

2. Description of the Related Art

US 2010/0285346 A1 discloses a battery module in which individual battery cells are plugged into one pot-shaped sleeve. The sleeve has a radially outward protruding collar with which the sleeve rests on a vertically extending web of a battery box. The sleeve can be rinsed with a coolant so that heat of the battery cell is absorbed from the sleeve and is transported away so that the battery cell can be cooled. Gaps between adjacent sleeves are sealed with a cover so that the coolant cannot pass through the gap to the pole of the battery cell that projects out of the sleeve.

There is a constant need to achieve a low weight and to be able to cool a stable battery module well for the purely electric driving of a motor vehicle.

The object of the invention is to provide a stable battery module for the purely electric driving of a motor vehicle with a low weight and good cooling.

SUMMARY OF THE INVENTION

The invention relates to a battery module for purely electric driving of a motor vehicle. The battery module has a trough-shaped battery box that runs around a circumferential direction. The battery box comprises an inlet for feeding a coolant into a cooling space that is bounded partially by the battery box and an outlet for conducting away the coolant from the cooling space. Battery cells for storing electrical energy are inserted into the battery box and are arranged to a large extent in the cooling space. An insulating layer is provided for fluid-tight sealing of the cooling space. At least one electrical pole of the battery cell projects out of the cooling space through the insulating layer. The insulating layer is formed from a cured sealing compound.

The cooling space formed in the battery box can be sealed sufficiently by the insulating layer so that the cooling space can be supplied with an electrically conductive cooling fluid, for example water, without the cooling fluid reaching the electrical pole of the battery cell that is guided through the insulating layer. As a result, a high cooling power can be achieved with a corresponding efficient operation of the battery cells. The sealing compound may be a two-component system with a resin and a curing agent applied in a liquid state and then cured to harden for forming the insulating layer. In this context, the sealing compound can be sufficiently free flowing in the liquid state for covering gaps and free spaces completely and for at least partially filling in passages between the surroundings and the cooling space. At the same time, the sealing compound can be sufficiently viscous in the liquid state so that the sealing compound in the liquid state cannot reach the cooling space through the intermediate spaces that are to be sealed and whose gap width is conditioned by clearance fits that are subject to tolerances. Thus, the sealing compound can become embedded in the intermediate spaces for producing a particularly stable and sealed connection of the insulating layer is produced when the sealing compound is cured. The sealing compound and therefore the insulating layer also can achieve an adhesive connection to the battery cell and/or to the battery box for further improving the insulating layer. The insulating layer also can have a suitably selected thickness in the vertical direction to provide a sufficiently high stability and strength that forces can be transmitted via the insulating layer. As a result, denting, bulging and a shearing movement of the battery box under load can be avoided. The insulating layer formed from the sealing compound has a significantly lower weight and a considerably better sealing effect when compared to a metal plate that provides the same stability. The insulating layer which is from the cured, previously liquid, sealing compound, can provide a high sealing effect, a statically stabilizing effect for the battery box and a low intrinsic weight. As a result, a stable battery module for purely electric driving of a motor vehicle with a low weight and good cooling is made possible.

A plate or a mat can be provided, as a substrate, during the application of the sealing compound in the liquid state to hold back the sealing compound and to prevent the sealing compound in the liquid state from flowing away into the cooling space. Only a clearance fit may be provided between the substrate and the battery cell and/or between the substrate and the battery box. The substrate can be removed after curing the sealing compound or can remain in the battery module. The battery box can be configured in a trough shape with a bottom, and the bottom can bound the cooling space downward in the direction of gravity. The bottom can have depressions and/or elevations for receiving the battery cells to permit a precise arrangement and orientation of the battery cells. Alternatively, the battery box can be configured as a wall that runs around in a frame shape, and a further component can be connected to the battery box to bound the cooling space downward. The battery cells can protrude with one pole in each case through this further component. As a result, electrical contact can be made with one pole above the insulating layer and another pole underneath the further component, in each case outside the cooling space. The inlet and/or the outlet can be formed by an opening that communicates with the cooling space in the battery box. The inlet and/or outlet can be connected to a hose. Alternatively, the inlet and/or outlet that communicates with the cooling space can be connected to the cooling space in the vertical direction through the insulating layer.

A sealing mat for holding the sealing compound in the liquid state back from the cooling space may be arranged underneath the insulating layer in the direction of gravity. Thus, the sealing compound is in direct contact with the sealing mat. The sealing mat can prevent the sealing compound from flowing away into the cooling space by taking into account the viscosity of the sealing compound and an intermediate space to be sealed between the sealing mat and the battery cells and/or the battery box. The sealing mat can have through-openings for plugging through the battery cells. The through-openings can form a clearance fit between the sealing mat and the respective battery cell. A transition fit or press fit can be provided instead of the clearance fit so that some of the material of the sealing mat can be forced out by the plugged-in battery cell. The sealing mat can ensure media separation between the insulating layer that is formed from the sealing compound, and the coolant that is inserted in the cooling space. As a the result even a material that lacks compatibility with the coolant can be used for the insulating layer.

An upper retaining plate may be arranged underneath the insulating layer in the direction of gravity and may be connected to the battery box for orienting at least some of the battery cells. The upper retaining plate bears the sealing mat and/or the insulating layer. The upper retaining plate can have through-openings for plugging through the battery cells. In particular, the through-opening may form a clearance fit between the upper retaining plate and the respective battery cell. An intermediate space between the retaining plate and the battery cell can be filled in at least partially by the cured sealing compound of the insulating layer and/or covered in a fluid-tight fashion. The upper retaining plate can permit correct arrangement and orientation of the battery cells and also can be assisted by the sealing mat to prevent the sealing compound from flowing away into the cooling space by taking into account the viscosity of the sealing compound and an intermediate space to be sealed between the upper retaining plate and the battery cells and/or the battery box.

A further insulating layer for fluid-tight sealing of the cooling space may be spaced apart from the insulating layer in the direction of gravity. The further insulating layer may be formed from a cured sealing compound. A further sealing mat may be provided for holding the sealing compound in the liquid state back from the cooling space and/or a lower retaining plate may be connected to the battery box for orienting at least some of the battery cells and may be provided above the insulating layer in the direction of gravity. The lower region of the battery module can be configured in an essentially symmetrical fashion with respect to the upper region. The preceding description relating to the insulating layer can apply correspondingly to the further insulating layer. In addition, the preceding description relating to the insulating mat and/or the upper retaining plate can apply to the further insulating mat and/or the lower retaining plate. This embodiment of the battery box is not in a trough shape, but rather is a wall that runs around in the peripheral direction to bound the cooling space and may be formed with the inlet and the outlet. The boundary of the cooling space upward in the direction of gravity can be effected by the insulating layer and the boundary of the cooling space downward in the direction of gravity can be effected by the further insulating layer. During the manufacture of the battery module, the sealing compound can initially be cast for the one insulating layer. After the curing of this sealing compound, the battery module can be turned to allow the sealing compound to be cast and cured for the other insulating layer. Thus, the manufacture of the battery module can take place quickly and simply with a small number of different manufacturing steps.

At least one electrical pole of the battery may project out of the cooling space through the further insulating layer. As a result, contact can be made with an electrical pole of a battery cell above the cooling space, and contact can be made with another electrical pole of the battery cell below the cooling space. This facilitates the simultaneous formation of electrical contact with a multiplicity of battery cells without risking a short circuit.

The upper retaining plate may be spaced apart from the lower retaining plate by means of a supporting spacer element, such as a spacer sleeve. Thus, denting and/or bulging of the respective retaining plate due to its intrinsic weight can be avoided. For example, a battery cell that otherwise is provided can be replaced by the respective spacer element. In addition, a suitable distance of the upper retaining plate from the lower retaining plate can be predefined by the spacer element when the battery module is mounted. As a result, the volume of the cooling space and therefore the installed cooling power can also be predefined and easily complied with.

The battery cell may be provided, at least in a region arranged in the cooling space, with an electrical insulator for electrically insulating the battery cell with respect to the coolant. The electrical insulator may be formed by a shrink-fit hose or a surface coating. As a result, a voltage applied to an outer side of the battery cell cannot bring about a short circuit with an adjacent battery cell via the coolant. In addition, the insulator can permit better adhesion to the insulating layer. Thus, the sealing effect can be improved. The insulation ensures good transmission of heat between the battery cell and the coolant.

At least one terminal mount may be provided for bearing a terminal plate that connects in each case one pole of a plurality of battery cells. At least one terminal mount may be cast partially in the insulating layer and/or in the further insulating layer. The terminal mount can rest on a housing of one or more battery cells. As a result, the weight of the terminal plate cannot be borne via the electrical poles of the battery cells, but rather via their housing. The electrical poles of the battery cells can be placed in electrical contact with the terminal plate via in each case one contact spring. As a result of the fact that the terminal mount is cast partially in the insulating layer, the terminal mount cannot be forced away from the terminal plate during the mounting. Instead, some of the weight of the terminal plate that is applied to the terminal mount can be borne via the insulating layer.

The insulating layer and/or the further insulating layer may be connected in a force-transmitting fashion to the battery box and/or to the battery cells. The insulating layer can be bonded to the battery box and/or to the battery cells, for example, by adhesion effects, and/or can adhere to the battery box and/or to the battery cells. The insulating layer can make contact completely with the battery box and/or the respective battery cell in the circumferential direction. In the case of loading, for example in the case of an accident, the loads that occur can be borne at least partially via the insulating layer. Thus, the battery module is more stable in design and damage to the battery cells can be avoided.

The sealing compound may be manufactured from an electrically non-conductive two-component resin, in particular on a polyurethane basis. As a result, the sealing compound can be cast easily in the liquid state and, without further assistance, can be cured and solidified after the casting by virtue of the curing agent contained in the sealing compound. In addition, the resin can easily bring about adhesion to the battery box and/or to the battery cells.

The invention will be explained by way of example below with reference to the appended drawings and on the basis of preferred exemplary embodiments, wherein the features illustrated below can represent an aspect of the invention either respectively individually or in combination.

DETAILED DESCRIPTION OF THE PREFERRED EMBODIMENTS

Figure 1:
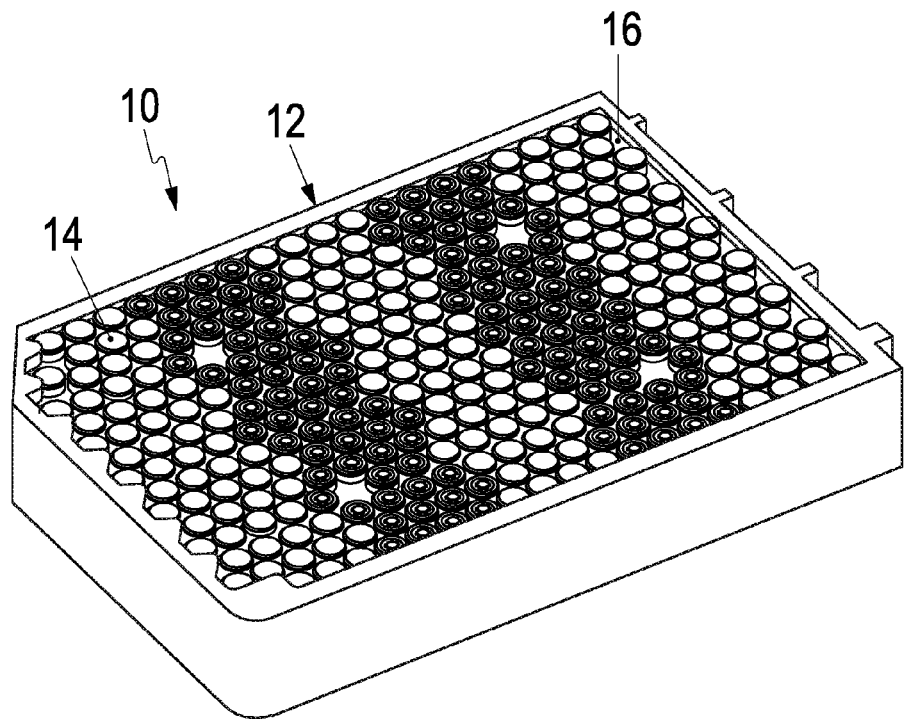
FIG. 1 is a schematic perspective view of a battery module.

The battery module 10 illustrated in FIG. 1 has a frame-shaped battery box 12 in which a multiplicity of, for example, cylindrical, vertically oriented battery cells 14 are inserted. An intermediate space between the respective battery cells 14 and between the battery cells 14 and the battery box 12 is filled in a fluid-tight fashion with an insulating layer 16 that is composed of a cured sealing compound.

Figure 2:
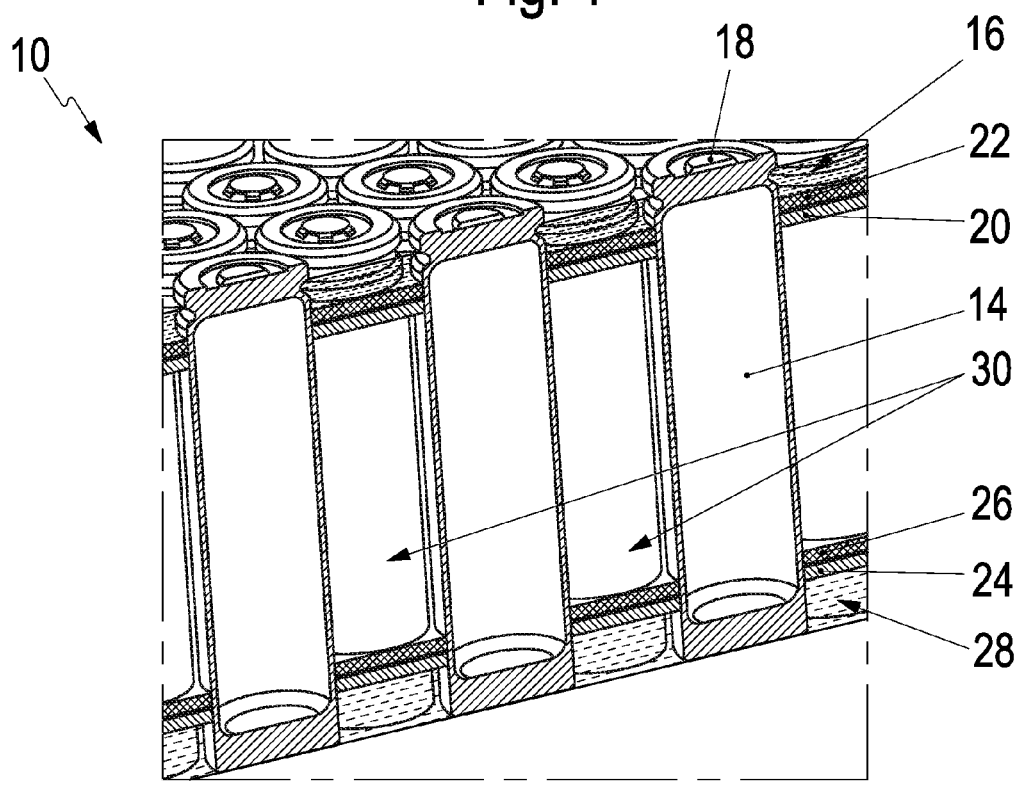
FIG. 2 is a schematic perspective sectional view through the battery module of FIG. 1.

As is illustrated in FIG. 2, an electrical pole 18 of the battery cells 14 projects up through the insulating layer 16. An upper retaining plate 20 is provided underneath the insulating layer 16 and is connected to the battery box 12 and with which the battery cells 14 are suitably arranged and oriented. A sealing mat 22 is provided between the upper retaining plate 20 and the insulating layer 16. The sealing mat 22 rests on the upper retaining plate 20 during the casting of the sealing compound for the insulating layer 16 and prevents the sealing compound from flowing through a clearance fit between the upper retaining plate 20 and the battery cell 14 and/or a clearance fit between the upper retaining plate 20 and the battery box 12. Provided essentially symmetrically with respect thereto are, in the lower region of the battery module 10, a lower retaining plate 26, a further sealing mat 24 arranged underneath the lower retaining plate 26, and a further insulating layer 28 arranged underneath the further sealing mat 24. A cooling space 30 is formed by the battery box 12, the insulating layer 16 and the further insulating layer 28, and a cooling fluid can flow around some of the battery cells 14 in the cooling space 30 to conduct away heat and cool the battery cells 14.

Figure 3:
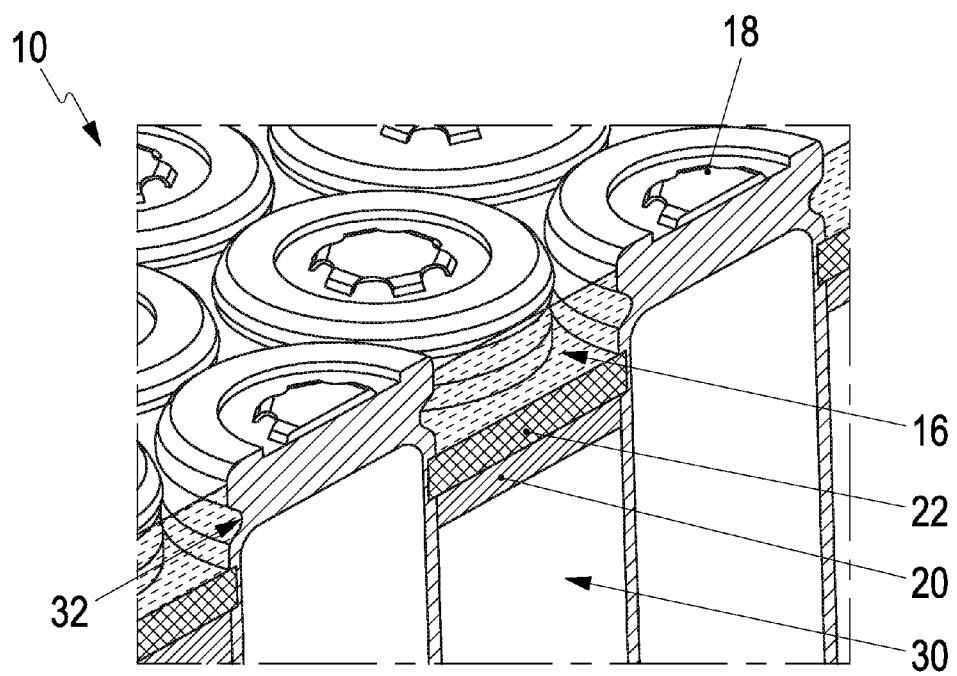
FIG. 3 is a schematic perspective view of a detail of the battery module of FIG. 2.

As illustrated in FIG. 3, the battery cells 14 can have a depression 32 that is closed in the circumferential direction and that can be filled by the sealing compound of the insulating layer 16. As a result, the insulating layer 16 is connected in a captive fashion to the battery cells 14 in the cured state of the sealing compound so that loads in the horizontal and/or vertical directions can be borne via the insulating layer 16.

Figure 4:
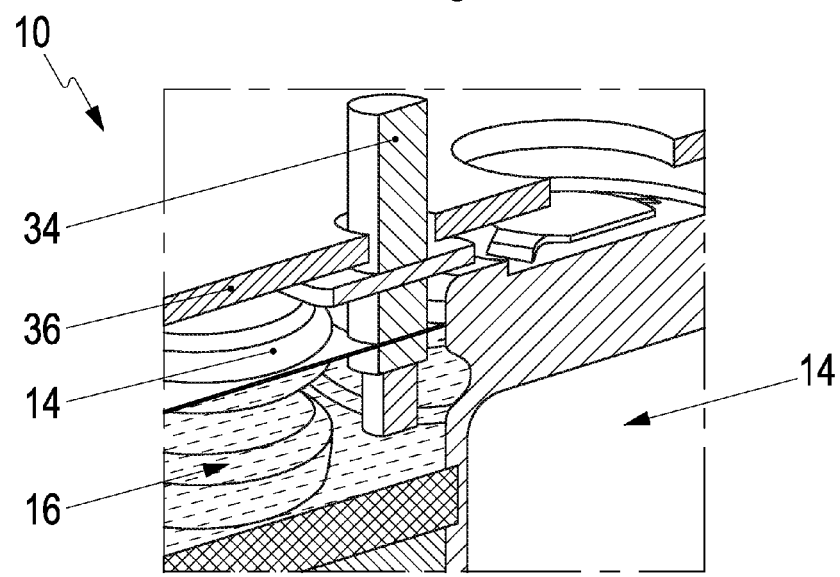
FIG. 4 shows a schematic perspective view of a detail of the battery module similar to FIG. 2 in a further embodiment.

As is illustrated in FIG. 4, a terminal mount 34 that rests, for example, on three battery cells 14 can be provided. The terminal mount 34 can bear a terminal plate 36 with which electrical contact can be made with the electrical poles 28 of the battery cells 14. The terminal mount 34 is cast partially in the insulating layer 16.

Figure 5:
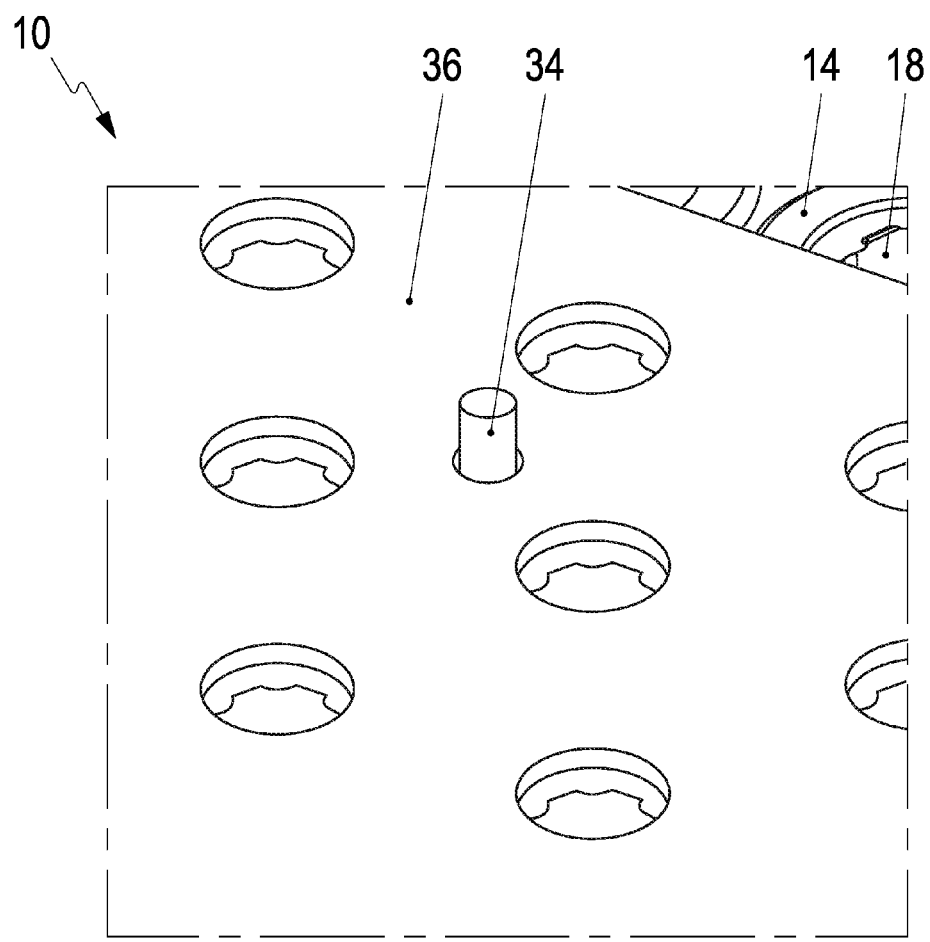
FIG. 5 is a schematic, perspective plan view of the battery module of FIG. 4.

As illustrated in FIG. 5, the terminal mount 34 can project with a part through the terminal plate 36. As a result, the terminal plate 36 can be oriented on the terminal mount 34. Since the terminal mount 34 can be cast in a captive fashion in the insulating layer 16, during orientation of the terminal plate 36 on the terminal mount 34 the terminal mount 34 cannot be pushed away inadvertently.

What is claimed is:

1. A battery module for the purely electric driving of a motor vehicle, comprising:
    a trough-shaped battery box that runs around a circumferential direction;
    an inlet for feeding a coolant into a cooling space that is partially bounded by the battery box;
    an outlet for conducting the coolant away from the cooling space;
    a plurality of battery cells for storing electrical energy, the battery cells being inserted into the battery box and arranged in the cooling space;
    a retaining plate mounted on the battery box to at least partially close the cooling space, the retaining plate having a plurality of through holes through which the plurality of battery cells project;
    a sealing mat mounted on the retaining plate for sealing clearances formed between the plurality of battery cells and the plurality of through holes in the retaining plate; and
    an insulating layer formed on the sealing mat from a cured sealing compound for fluid-tight sealing of the cooling space, wherein at least one electrical pole of the battery cell projects out of the cooling space through the insulating layer.

2. The battery module of claim 1, wherein the sealing mat prevents the sealing compound in a liquid state from entering the cooling space.

3. The battery module of claim 1, wherein a further insulating layer is spaced apart from the insulating layer in the direction of gravity for fluid-tight sealing of the cooling space, the further insulating layer being formed from a cured sealing compound, and a further sealing mat for holding the sealing compound in the liquid state back from the cooling space and a lower retaining plate above the insulating layer in the direction of gravity and connected to the battery box for orienting at least some of the battery cells.

4. The battery module of claim 3, wherein at least one electrical pole of the battery cell projects out of the cooling space through the further insulating layer.

5. The battery module of claim 3, wherein the upper retaining plate is spaced apart from the lower retaining plate by a supporting spacer element.

6. The battery module of claim 1, wherein the battery cell is provided, at least in a region arranged in the cooling space, with an electrical insulator for electrically insulating the battery cell with respect to the coolant, the electrical insulator being formed by a shrink-fit hose or a surface coating.

7. The battery module of claim 1, further comprising at least one terminal mount for bearing a terminal plate that connects in each case one pole of a plurality of battery cells, the at least one terminal mount being cast at least partially in at least one of the insulating layer and the further insulating layer.

8. The battery module of claim 1, wherein the insulating layer is connected in a force-transmitting fashion to at least one of the battery box and the battery cells.

9. The battery module of claim 1, wherein the sealing compound is manufactured from an electrically non-conductive two-component resin.

10. A battery module for the purely electric driving of a motor vehicle, comprising:
    a trough-shaped battery box that runs around a circumferential direction;
    an inlet for feeding a coolant into a cooling space that is partially bounded by the battery box;
    an outlet for conducting the coolant away from the cooling space;
    a plurality of battery cells for storing electrical energy, the battery cells being inserted into the battery box and arranged in the cooling space;
    a first retaining plate mounted on the battery box to at least partially close the cooling space, the first retaining plate having a plurality of through holes through which the plurality of battery cells project;
    a first sealing mat mounted on the first retaining plate for sealing clearances formed between the plurality of battery cells and the plurality of through holes in the first retaining plate a first insulating layer formed from a cured sealing compound for fluid-tight sealing of the cooling space, wherein at least one electrical pole of the battery cell projects out of the cooling space through the insulating layer; and a second insulating layer spaced from the first insulating layer in the direction of gravity for fluid-tight sealing of the cooling space, the second insulating layer being formed from a cured sealing compound; and a second sealing mat for holding the sealing compound of the second insulating layer in a liquid state back from the cooling space and a second retaining plate above the second insulating layer in the direction of gravity and connected to the battery box for orienting at least some of the battery cells.

11. The battery module of claim 10, wherein at least one electrical pole of the battery cell projects out of the cooling space through the second insulating layer.

12. The battery module of claim 10, wherein the first retaining plate is spaced apart from the second retaining plate by a supporting spacer element.

13. The battery module of claim 10, wherein the battery cell is provided, at least in a region arranged in the cooling space, with an electrical insulator for electrically insulating the battery cell with respect to the coolant, the electrical insulator being formed by a shrink-fit hose or a surface coating.

14. The battery module of claim 10, further comprising at least one terminal mount for bearing a terminal plate that connects in each case one pole of a plurality of battery cells, the at least one terminal mount being cast at least partially in at least one of the first insulating layer and the second insulating layer.

15. The battery module of claim 10, wherein at least one the first and second insulating layers are connected in a force-transmitting fashion to at least one of the battery box and the battery cells.

16. The battery module of claim 10, wherein the sealing compound is manufactured from an electrically non-conductive two-component resin.

\* \* \* \* \*